United States Patent Office 3,819,668
Patented June 25, 1974

3,819,668
PERFLUOROALKYLALKYLMONOCARBOXYLIC ACID ESTERS
Horst Jaeger, Bettingen, Switzerland, assignor to Ciba-Geigy AG, Basel, Switzerland
No Drawing. Filed Feb. 3, 1971, Ser. No. 112,474
Claims priority, application Switzerland, Feb. 9, 1970, 1,824/70
Int. Cl. C07c 69/62; D06m 15/48
U.S. Cl. 260—408        10 Claims

ABSTRACT OF THE DISCLOSURE

Perfluoroalkylalkylmonocarboxylic acid esters are provided which are derived from perfluoro-acids and aliphatic epoxides. These esters contain at least one perfluoroalkyl radical with 4 to 14 carbon atoms, which is bonded over an alkylene bridge with 1 to 10 carbon atoms to the carboxyl group, which carboxyl group is esterified with an epoxide containing further condensable groups in the terminal position such as halogen atoms or a hydroxyl group.

The perfluoroalkylalkylmonocarboxylic acid esters are used for treating porous or non porous substrates, preferably for the production of oleophobic furnishes above all on fibrous materials such as textiles and papers.

---

The subject of the present application are perfluoroalkylalkylmonocarboxylic acid esters which contain (a) at least one perfluoroalkyl radical with 4 to 14 carbon atoms, which is bonded via an alkylene group with 1 to 10 carbon atoms to a carboxyl group, which is bonded in an ester-like manner to (b) an acyclic, aliphatic radical which is substituted by a hydroxyl group in the 2-position to the ester bridge, the radical containing yet further condensable groups in the terminal position.

The alkylene group via which the perfluoroalkyl radical is bonded to the carboxyl group, can be acyclic—branched or unbranched—or cyclic. The acyclic radicals contain 1 to 10 carbon atoms, whilst the cycloalkylene radicals possess 5 or 6 ring carbon atoms. The ethylene, n-butylene, n-decylene, isopropylene, or cyclohexylene radical may be mentioned as examples.

Preferred compounds are perfluoroalkylalkylmonocarboxylic acid esters of the formula (1)        R—Q—COO—A—X
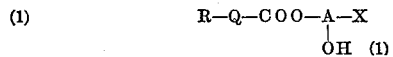

wherein R denotes a perfluoroalkyl radical with 4 to 14 carbon atoms, Q denotes an acyclic alkylene radical with 1 to 10 carbon atoms, preferably a n-alkylene radical, or a cycloalkylene radical with 5 or 6 ring carbon atoms, A denotes an alkyl radical which is optionally substituted further and X denotes a halogen atom, a hydroxyl group or a Y—O—($CH_2CH_2O$)$_n$— group, wherein Y represents a hydrogen atom, an alkyl radical or an epoxyalkyl radical, $n$ is an integer from 1 to 20, and the hydroxyl group (1) is in the 2-position to the R—COO— group.

Amongst these, perfluoroalkylalkylmonocarboxylic acid esters of the formula (II)        R—($CH_2$)$_p$—COO—A—X
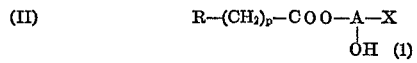

wherein R, A and X have the indicated meaning, $p$ denotes an integer from 1 to 10, preferably 2 to 6, and the hydroxyl group (1) is in the 2-position to the R—($CH_2$)$_p$—COO— group, are of particular interest.

Amongst these compounds, those of the formula (III) 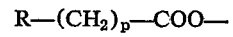

wherein R, X and $p$ have the indicated meaning, $A_1$ denotes a hydrogen atom or an alkyl radical and $A_2$ denotes an alkylene radical, are particularly suitable.

A preferred position is occupied here by the perfluoroalkylalkylmonocarboxylic acid esters of the formula (IV) 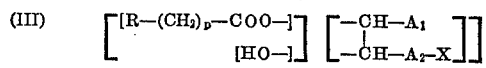

wherein R has the indicated meaning, $A_3$ denotes a hydrogen atom or an alkyl radical with 1 to 8 carbon atoms, $A_4$ denotes an alkylene radical with 1 to 8 carbon atoms and $X_1$ denotes a chlorine atom, a bromine atom, hydroxyl group or $Y_1$—O—($CH_2CH_2O$)$_n$— group, wherein $Y_1$ represents a hydrogen atom or an alkyl with 1 to 4 carbon atoms or epoxyalkyl group with 2 to 4 carbon atoms, and $n$ is an integer from 1 to 20, and $p_1$ is an integer from 2 to 6.

Compounds of particular practical interest are those of the formula (V) 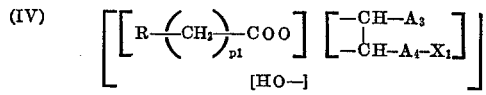

wherein R, $p_1$ and $A_4$ have the indicated meaning, $A_5$ denotes a hydrogen atom, a methyl group or an ethyl group, and $X_2$ denotes a chlorine or bromine atom or a hydroxyl or $Y_2$—O—($CH_2CH_2O$)$_{n_1}$— group, wherein $Y_2$ denotes hydrogen, methyl or glycidyl and $n_1$ denotes an integer from 1 to 15.

Amongst these, the perfluoroalkylalkylmonocarboxylic acid esters which correspond to the formula (VI) 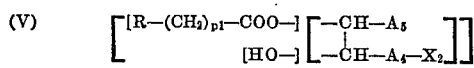

wherein R and $p_1$ have the indicated meaning and $X_3$ is chlorine or preferably hydroxyl, are of importance.

The perfluoroalkyl radical of the perfluoroalkylalkylmonocarboxylic acid esters according to the invention preferably contains 5 to 11, or especially 7 to 9, carbon atoms. The perfluoroalkyl radical can be either branched or unbranched, that is to say it is also possible for iso-perfluoroalkyl radicals, for example of the formula (VII) 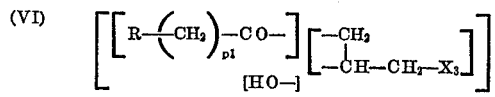

wherein $m$ represents an integer having a value of 1 to 11, to be present. However, n-perfluoroalkyl radicals are always preferred. Further, the perfluoroalkyl radical can also be a ω-H-perfluoroalkyl radical.

As examples, there may be mentioned the perfluoroalkylalkylmonocarboxylic acid esters of the formula (VIII)
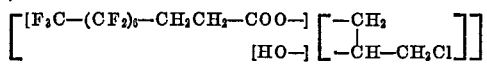

or (IX)
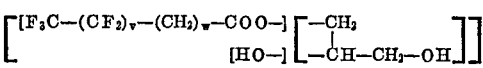

$v = 5, 7, 9$; $w = 2, 4, 6$.

The perfluoroalkylmonocarboxylic acid esters according to the invention are obtained by reaction (1) of a perfluoroalkylalkylmonocarboxylic acid, which contains a perfluoroalkyl radical with 4 to 14 carbon atoms, which is bonded via an alkylene bridge with 1 to 10 carbon atoms to the carboxyl group, with (2) an acyclic, aliphatic epoxide which contains yet further condensable groups in the terminal position. The reaction temperature is between 20 and 70° C., preferably between 20 and 40° C. Depending on the reaction temperature and the reactivity of the reactants, the reaction takes 1 to 24 hours, but is in general complete after 4 to 8 hours. Preferably, the reaction is allowed to take place in the presence of a catalyst, such as for example anhydrous sodium acetate. The reaction is appropriately carried out in a solvent, such as for example ethyl acetate.

The new perfluoroalkylalkylmonocarboxylic acid esters of the formula (I) or (II) are manufactured by reaction of a perfluoro-acid of the formula (X)    R—Q—COOH or (XI)    R—(CH$_2$)$_p$—COOH as component (1)

with an epoxide of the formula (XII)    O<A—X as component (2)

wherein R, Q, P, A and X have the indicated meaning.

The compounds of the formula (III) are manufactured analogously, employing, as component (2) an epoxide of the formula (XIII)

wherein A$_1$, A$_2$ and X have the indicated meaning.

To manufacture the compounds of the formulae (VI) or (V), epoxides of the formulae

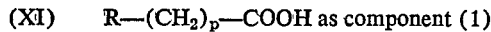
(XIV)    (XV)

wherein A$_3$, A$_4$, A$_5$, X$_1$ and X$_2$ have the indicated meaning, are used.

Compounds of the formula (VI) are obtained by using epichlorohydrin or glycidol as component (2).

The following examples of hydroxyalkylepoxides which can be easily prepared and can subsequently easily be esterified may further be mentioned, without thereby restricting the epoxides amenable to the reaction according to the invention with respect to their number and the nature of their condensable grouping: 9-epoxyoctadecanol-1, 1-epoxy-octanol-3, 1-epoxy-nonanol-4, 1-epoxy-4-methylhexanol-4, 2-epoxy-5-methylheptanol-5, 1-epoxy-5-methylpentanol-4, 4-epoxypentanol-1, 3-epoxypentanol-1 and 1-epoxypentanol-4.

The preparation of the particularly interesting perfluoroalkylalkylmonocarboxylic acid esters of which the perfluoroalkyl radical contains 5 to 11, preferably 7 to 9, carbon atoms is achieved by reacting a perfluoroalkylmonocarboxylic acid with 5 to 11, preferably 7 to 9, carbon atoms in the perfluoroalkyl radical, with the component (2). In the formula (XI), $p$ is preferably a number from 2 to 6, especially 2, 4 or 6.

The reaction of a perfluoroalkylalkylmonocarboxylic acid with an epoxide necessarily yields an isomer mixture of two perfluoroalkylalkylmonocarboxylic acid hydroxyalkyl esters, since the carboxyl group and hydroxyl group can add to either carbon atom of the epoxide grouping. This formation of an isomer mixture is expressed in the formulae (III) to (VI), (VIII) and (IX), in that the particular positions of the substituents are not fixed therein.

The reaction of 2,2,3,3-H-pentadecafluorodecylic acid with epichlorohydrin, which may be mentioned as an example, yields the following isomer mixture:

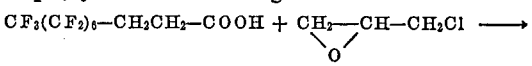

(XVI)    (XVII)

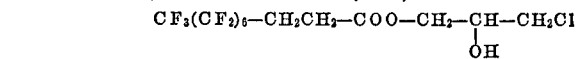

and (XVIIIa)

(XVIIIb)  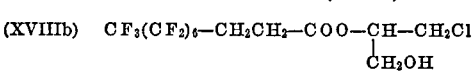

As a result of the presence of free hydroxyl groups, the perfluoroalkylalkylmonocarboxylic acid esters according to the invention react with compounds which contain several functional groups capable of reacting with hydroxyl groups, such as 1,2-epoxide groups, isocyanate groups, acrylic groups, methylol groups, methylol groups etherified with lower alcohols, aldehyde groups, easily hydrolysable ester groups and the like. Such polyfunctional compounds are therefore suitable for use as crosslinking components or curing components for the perfluoroalkylalkylcarboxylic acid esters, containing hydroxyl groups, according to the invention.

As such crosslinking components there may especially be mentioned: epoxide compounds, namely polyglycidyl ethers, such as butanediol diglycidyl ether and diglycidyl ether, diisocyanates and polyisocyanates, such as o-, m- and p-phenylenediisocyanate, toluylene-2,4-diisocyanate and 1,5-naphthylenediisocyanate; acrylyl compounds such as methylene-bis-acrylamide and symmetrical triacrylylperhydrotriazine; poly-(2,3-dihydro-1,4-pyranyl) compounds, such as (2,3-dihydro-1',4'-pyran-2'-yl)-methylester; aldehydes, such as formaldehyde or glyoxal, and soluble phenol-formaldehyde condensation products, such as novolaks or resols. Preferably, aminoplasts which are soluble in water or in organic solvents are used as crosslinking components.

As such, there may be used formaldehyde condensation products of urea, thiourea, guanidine, acetylenediurea and dicyandiamide, and also of aminotriazines, such as melamine, or of guanamines, such as acetoguanamine, benzoguanamine, tetrahydrobenzoguanamine or formoguanamine as well as their ethers with alcohols, such as methyl, ethyl, propyl, allyl, butyl, amyl and hexyl alcohol, cyclohexanol, benzyl alcohol, lauryl alcohol, and stearyl, oleyl or abietyl alcohol. In addition to the ether radicals, the condensation products can also further contain radicals of higher-molecular acids, such as for example stearic acids.

Particularly good technical results in the field of textile finishing are obtained on using water-soluble condensation products of formaldehyde and melamine and especially the esterification product or etherification product of hexamethylolmelamine-methyl-ether and stearic acid or stearyl alcohol as crosslinking components.

The perfluoroalkylalkylmonocarboxylic acid esters can also be used as a mixture with polymers not containing fluorine. Very suitable polymers not containing fluorine are here, for example, the homopolymers of acrylic or methacrylic acid esters, such as poly(ethyl acrylate) or copolymers of acrylic or methacrylic acid esters with methylolacrylamide or methylolmethacrylamide.

The perfluoroalkylalkylmonocarboxylic acid esters according to the invention can, by virtue of their reactive groupings, be used for the treatment of porous and non-porous substrates, preferably for producing oleophobic finishes thereon, and can be incorporated into the material in question or above all applied to its surface. By porous substrates, there are to be understood leather or preferably fibre materials such as textiles and paper, whilst possible non-porous materials are plastics and above all surfaces of metals and glass.

The finishing of the substrate with the perfluoroalkylalkylmonocarboxylic acid esters according to the invention can be carried out in a process stage by itself, but also in the same process stage as the application of further finishing agents, for example together with known agents for conferring hydrophobic properties such as paraffin emulsions or solutions or emulsions of fatty acid condensation products, for example with aminoplasts precondensates.

Further, a so-called "soil release" and "anti-soiling" effect can also be achieved with the perfluoro compounds according to the invention, especially on cotton.

Simultaneously with the effect of imparting an oleophobic finish, these perfluoro compounds also show hydrophilic properties. For imparting an oleophobic finish, the substrates can be treated either with solutions or with dispersions or emulsions of the perfluoro compounds. Perfluoroalkylalkylmonocarboxylic acid esters can for example also be applied to the textile material as a solution in an organic solvent, and be fixed thermally to the fabric after evaporation of the solvent.

Textile materials are of particular interest for finishing by means of the perfluoroalkylalkylmonocarboxylic acid esters according to the invention. Textile materials for example include those of native or regenerated cellulose, such as cotton, linen or rayon, viscose staple or cellulose acetate. However, textiles of wool, synthetic polyamides, polyesters or polyacrylonitrile can also be treated. Mixed woven fabrics or mixed knitted fabrics of cotton-polyester fibres can also be finished advantageously. The textiles can in these cases be in the form of filaments, fibres or flocks, but preferably of woven fabrics or knitted fabrics.

Preparations which contain the perfluoro compounds according to the invention can be applied to the substrate in a customary manner which is in itself known. Woven fabrics can for example be impregnated by the exhaustion process or on a padder which is charged with the preparation at room temperature. The impregnated material is thereafter dried at 60 to 120° C. and is subsequently optionally further subjected to a heat treatment at over 100° C., for example at 120° to 200° C.

The textiles thus treated as a rule show an oil-repellent effect and where the preparation additionally contains an agent for conferring hydrophobic properties, this effect is coupled with a water-repellent effect.

EXAMPLE 1

4.6 g. of epichlorohydrin and 22.1 g. of 2,2,3,3-H-pentadecafluorodecylic acid are dissolved at room temperature in 100 ml. of ethyl acetate, with the addition of 1 g. of anhydrous sodium acetate.

The temperature rises to 25.° C. The reaction temperature is kept constant at 50° C. and after 18 hours' reaction the epoxide content is 0%. The solution is concentrated in vacuo at 40° C. The residue is taken up in 100 ml. of diethyl ether and washed 3 times with 20 ml. of water, and yields a light yellow phase. Weight 17.3 g.=70.04% of theory.

The structure is confirmed by recording a mass spectrum in that this shows a molecular weight of 534–536, which corresponds to a product of the formula (VIII).

EXAMPLE 2

9.25 g. of epichlorohydrin and 49.2 g. of perfluoroalkylalkylmonocarboxylic acid [1], together with 2 g. of sodium acetate (anhydrous), are dissolved in 100 ml. of ethyl acetate.

The reaction mixture is kept for 7 hours at 80° C. After completion of the reaction, the solution is freed of the sodium acetate by filtration and the solvent is removed in vacuo.

A water-soluble substance is thereby isolated. Yield 45 g.=73.4% of theory.

The structure is confirmed by recording a mass spectrum, in that molecular weights of 684, 612, 712 and 640 are found, which corresponds to a formula (1) 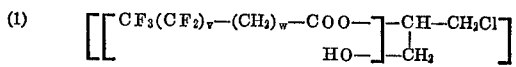

$v=5, 7, 9; w=2, 4, 6$.

EXAMPLE 3

7.4 g. of glycidol together with 49.2 g. of perfluoroalkylalkylmonocarboxylic acid [2] and 2 g. of sodium acetate (anhydrous) are dissolved in 100 ml. of ethyl acetate.

The reaction mixture is kept for 9 hours at 80° C. After completion of the reaction, the solution is freed of the sodium acetate by filtration, and the solvent is removed in vacuo. A water-soluble substance is thereby isolated. Yield: 51.5 g.=89.5%.

The structure is confirmed by recording a mass spectrum, in that molecular weights of 666, 622, 594 and 694 are found, which corresponds to a product of the formula (IX).

EXAMPLE 4

7.4 g. glycidol together with 60.4 g. of perfluoroalkyldecylcarboxylic acid [3] and 2 g. of anhydrous sodium acetate are dissolved in 400 ml. of ethyl acetate, and thereafter the reaction is carried out as described in Example 2 and 3.

Yield: 47.2 g.=69.62% of theory.

The substance is waxy. The structure is confirmed by recording a mass spectrum, in that this shows molecular weights of 578, 678 and 778, which corresponds to the following structure:

(2) 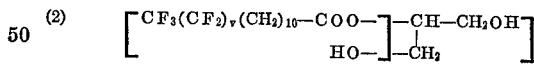

$v=5, 7, 9$.

EXAMPLE 5

7.4 g. of glycidol together with 54.6 g. of perfluoroalkylcyclohexylcarboxylic acid and 2 g. of anhydrous Na acetate are dissolved in 400 ml. of ethyl acetate and the reaction is carried out as described in Example 2 and 3.

Yield: 32.5 g.=52.4% of theory.

The substance is viscous and light yellow. The structure is confirmed by recording a mass spectrum, in that this

---

[1] The perfluoroalkylalkylmonocarboxylic acid used has the following composition, according to the gas chromatogram (GC) and mass spectrum (MS):
16% of $CF_3(CF_2)_9C_2H_4COOH$: M 592
3% of $CF_3(CF_2)_{11}C_2H_4COOH$: M 692
2% of $CF_3(CF_2)_5C_4H_8COOH$: M 420
32% of $CF_3(CF_2)_7C_4H_8COOD$: M 520
34% of $CF_3(CF_2)_9C_4H_8COOH$: M 620
1% of $CF_3(CF_2)_5C_6H_{12}COOH$: M 448
11% of $CF_3(CF_2)_7C_6H_{12}COOH$: M 548

[2] The perfluoroalkylalkylmonocarboxylic acid used has the same composition as in Example 2.

[3] The perfluoroalkyldecylcarboxylic acid used has the following composition:
26.1% of $C_6F_{13}(CH_2)_{10}COOH$: M 504
48.2% of $C_8F_{17}(CH_2)_{10}COOH$: M 604
23.5% of $C_{10}F_{21}(CH_2)_{10}COOH$: M 704 shows molecular weights of 520, 620 and 720, which corresponds to the following structure:

(3) 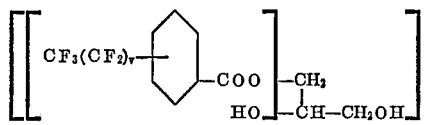

$v = 5, 7, 9$.

The perfluoroalkylcyclohexylcarboxylic acid has the following composition:

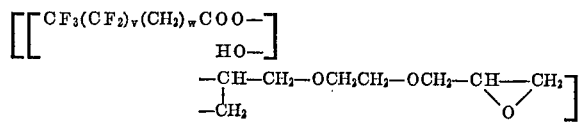

EXAMPLE 6

32 g. of perfluoroalkylalkylmonocarboxylic acid [4] together with 21.1 g. of polyethylene glycol-diglycid (average molecular weight of the polyethylene glycol=300) and 1 g. of anhydrous sodium acetate are dissolved in 150 ml. of ethyl acetate.

The reaction is carried out as described in Example 2 and 3 and yields 51.3 g.=96.6% of theory of a light brown wax of the presumed formula:

(4) 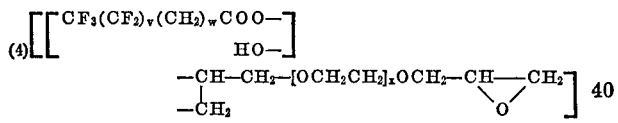

$v = 7, 9, 11; w = 2, 4, 6; x = 5$ to $10$.

EXAMPLE 7

6 g. of perfluoroalkylalkylmonocarboxylic acid [5] are

[4] The perfluoroalkylalkylmonocarboxylic acid used has the following composition:

| M 620 | $C_{10}F_{21}(CH_2)_4COOH$ | 75% |
| M 548 | $C_8F_{17}(CH_2)_6COOH$ | 19.3% |
| M 520 | $C_8F_{17}(CH_2)_4COOH$ | 5.7% |
| M 692 | $C_{12}F_{25}(CH_2)_2COOH$ | |

[5] The perfluoroalkylalkylmonocarboxylic acid used has the following composition according to a gas chromatogram and mass spectrum:
- 19.1% of $CF_3(CF_2)_5CH_2CH_2COOH$: M 392
- 34.5% of $CF_3(CF_2)_7CH_2CH_2COOH$: M 492
- 12.7% of $CF_3(CF_2)_9CH_2CH_2COOH$: M 592
- 10.7% of $CF_3(CF_2)_5(CH_2CH_2)_2COOH$: M 420
- 15.1% of $CF_3(CF_2)_7(CH_2CH_2)_2COOH$: M 520
- 6.3% of $CF_3(CF_2)_9(CH_2CH_2)_2COOH$: M 620 dissolved in 30 ml. of ethyl acetate and 0.5 g. of sodium acetate (anhydrous) is added. 2.12 g. of ethylene diglycid dissolved in 10 ml. of ethyl acetate are added dropwise.

The reaction and working up take place as indicated in Examples 2 and 3.

Yield: 7.3 g.=89.7% of theory.

The structure is confirmed after recording a mass spectrum.

(5)
$$\left[\left[\begin{array}{c} CF_3(CF_2)_v(CH_2)_wCOO- \\ HO- \end{array}\right]\begin{array}{c} -CH-CH_2-OCH_2CH_2-OCH_2-CH-CH_2 \\ -CH_2 \qquad\qquad\qquad\qquad\qquad \diagdown O \diagup \end{array}\right]$$

$v = 5, 7, 9; w = 2, 4$.

EXAMPLE 8

2 g. of the end product according to Example 1 are dissolved in 10 ml. of ethyl acetate. Woven pieces of wool are dipped into the solution, and thus impregnated. A piece of filter paper is impregnated in the same manner.

The fabric sample and paper sample are thereafter dried for 10 minutes at 130° C. in vacuo.

The assessement of the oil-repellent effect is carried out according to the so-called "3M oil repellency test" (Crajech and Petersen, Textile Research Journal 32, pages 320 to 331 (1960)), using heptane-Nujol mixtures. In the assessment, 150 denotes the best achievable rating. Individual samples are assessed immediately after drying.

The wool fabric sample is given a rating of 70 and the paper sample a rating of 90. The finish is of oleophobic character.

EXAMPLE 9

The following liquors are prepared from the products of Examples 2 to 7 (concentrations in g./l.)

| Constituents | A | B | C | D | E | F | G | H | I | J | K |
|---|---|---|---|---|---|---|---|---|---|---|---|
| Product from— | | | | | | | | | | | |
| Example 2 | | | | | 10 | 20 | | | | | |
| Example 3 | 10 | 20 | 20 | | | | | | | | |
| Example 4 | | | | | | | 40 | | | | |
| Example 5 | | | | | | | | 40 | | | |
| Example 6 | | | | | | | | | 7.5 | 15 | |
| Example 7 | | | | | | | | | | 10 | 10 |
| Dimethylolglyoxal monourein | | | | | | | | | 150 | | |
| (*) | 100 | 100 | | | | | | | | | |
| (**) | | | 30 | 30 | 30 | | | | | 10 | |
| $MgCl_2$ | 10 | 10 | | | | | | | 15 | 1.5 | 1.5 |
| Chloroacetic acid | | | 3 | 3 | 3 | 3 | 3 | | | | |
| Water | 500 | 500 | | | | 250 | 250 | 500 | 500 | 1,000 | 1,000 |
| Ethanol | 500 | 500 | 1,000 | 1,000 | 1,000 | 750 | 750 | 500 | 500 | | |
| Dioxane | | | | | | | | | | | |

*50% strength aqueous solution of 1 mol of hexamethylolmelamine-hexamethyl-ether and 1 mol of dimethylol urea
**Hexamethylolmelamine-pentamethyl-ether Pieces of woven fabric of cotton and, in part, cotton-polyester are successively dipped into this liquor, thereby impregnated with the perfluoro compound, and thereafter dried at 140° C. for 5 minutes in vacuo, in the course of which the resin finish cures.

The assessment of the oil-repellent effect is made as indicated in Example 8, but in part also after 1, 5 and 10 SNV-3-washes (SNV-3-wash: wash for 30 minutes at 60° C. in a washing liquor which per litre contains 5 g. of soap and 2 g. of anhydrous sodium carbonate, using a liquor ratio of 1:50).

The results are summarised in the table below:

| Substrate | Liquor | | | | | | | | | | |
|---|---|---|---|---|---|---|---|---|---|---|---|
| | A | B | C | D | E | F | G | H | I | J | K |
| Cotton, as such | 110 | 120 | 120 | 110 | 110 | 90 | 90 | 120 | 100 | 100 | 100 |
| 1 x SNV3 | 110 | 110 | 100 | | | 80 | 80 | | | 50 | 50 |
| 5 x SNV3 | 100 | 110 | | | | | | | | | |
| 10 x SNV3 | 100 | 110 | | | | | | | | | |
| Cotton/polyester, as such | | | 100 | | | | | 120 | 110 | 90 | 80 |
| 1 x SNV3 | | | 100 | | | | | | | 50 | 50 |
| 5 x SNV3 | 90 | 100 | 90 | | | | | | | | |
| 10 x SNV3 | 90 | 100 | 80 | | | | | | | | |

Cotton-polyester fabrics which have been finished with the liquors A, B, C, H and I, are additionally also tested for the soil-release effectiveness of the finishes. In this, the test specimens are spotted with synthetic, "skin grease" (Spangler, Cross and Sohaafsma, J. Am. Oil Soc. 43, 723, 1965) and Nujol.

The spots are applied before the first, and in part also before the fifth and tenth, SNV-3 wash, and subsequently assessed. The samples are graded according to ratings 1 to 5, with rating 5 denoting "completely washed out" and rating 1 "not washed out," that is to say 5 is the best rating.

| | Treated with liquor | | | | |
|---|---|---|---|---|---|
| | A | B | C | H | I |
| Nujol: | | | | | |
| 1 x SNV3 | 4 | 4.8 | 5 | 2.5 | 2.5 |
| 5 x SNV3 | 3 | 3 | 4.5 | | |
| 10 x SNV3 | 2.8 | 3.5 | 4.8 | | |
| Skin grease: | | | | | |
| 1 x SNV3 | 4 | 4.8 | 4 | 2.5 | 2.5 |
| 5 x SNV3 | 4.5 | 3.5 | 4.5 | | |
| 10 x SNV3 | 3.5 | 4 | 4 | | |

I claim:

1. Perfluoroalkylalkylmonocarboxylic acid esters corresponding to the formula $$R-Q-COO-A-X$$
$$\phantom{R-Q-COO-}|\phantom{-X}$$
$$\phantom{R-Q-COO-}OH \quad (1)$$

wherein R denotes a perfluoroalkyl radical with 4 to 14 carbon atoms, Q denotes an acyclic alkyl radical with 1 to 10 carbon atoms, or a cycloalkylene radical with 5 or 6 ring carbon atoms, A denotes an alkylene radical with 2 to 18 carbon atoms and X denotes a halogen atom, a hydroxyl group or a Y—O—(CH$_2$CH$_2$O)$_n$— group, each of said X substituents being attached to a carbon atom other than the one carrying the hydroxyl group (1), wherein Y represents a hydrogen atom, an alkyl radical with 1 to 4 carbon atoms or an epoxyalkyl radical with 2 to 4 carbon atoms, $n$ is an integer having a value of 1 to 20, and the hydroxyl group (1) is in the 2-position to the R—Q—COO— group.

2. Perfluoroalkylalkylmonocarboxylic acid esters according to claim 1, characterised in that they correspond to the formula $$R-(CH_2)_p-COO-A-X$$
$$\phantom{R-(CH_2)_p-COO-}|\phantom{-X}$$
$$\phantom{R-(CH_2)_p-COO-}OH \quad (1)$$

wherein R, A and X have the meaning indicated in claim 2, $p$ denotes an integer having a value of 1 to 10, and the hydroxyl group (1) is in the 2-position to the $$R-(CH_2)_p-COO-$$

group.

3. Perfluoroalkylalkylmonocarboxylic acid esters according to claim 2, characterised in that $p$ is an integer having a value of 2 to 6.

4. Perfluoroalkylalkylmonocarboxylic acid esters according to claim 1 characterised in that they correspond to the formula

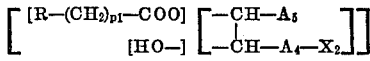

wherein R has the meaning indicated in claim 2 and $p$ is 1 to 10, $A_3$ denotes a hydrogen atom or an alkyl radical with 1 to 8 carbon atoms, $A_4$ denotes an alkylene radical with 1 to 8 carbon atoms and $X_1$ denotes a chlorine atom or bromine atom, a hydroxy group or a $$Y_1-O-(CH_2CH_2O)_n-$$

group, with $Y_1$ representing a hydrogen atom, an alkyl group with 1 to 4 carbon atoms or an epoxyalkyl group with 2 to 4 carbon atoms, and $n$ is an integer having a value of 1 to 20.

5. Perfluoroalkylalkylmonocarboxylic acid esters according to claim 1 characterised in that they correspond to the formula

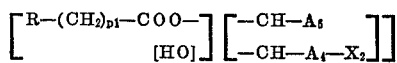

wherein R has the meaning indicated in claim 2 and $A_4$ is an alkylene radical with 1 to 8 carbon atoms, $p_1$ is an integer having a value of 2 to 6, $A_5$ denotes a hydrogen atom or a methyl or ethyl group, and $X_2$ denotes a chlorine or bromine atom or a hydroxyl or $$Y_2-O-(CH_2CH_2O)_{n_1}-$$

group, wherein $Y_2$ represents a hydrogen atom or a methyl or glycidyl group and $n_1$ is an integer from 1 to 15.

6. Perfluoroalkylalkylmonocarboxylic acid esters according to claim 1 characterised in that they correspond to the formula

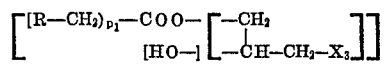

wherein $X_3$ denotes chlorine or hydroxyl and R has the meaning indicated in claim 2, and $p_1$ is 2 to 6.

7. Perfluoroalkylalkylmonocarboxylic acid esters according to claim 1 characterised in that they contain a perfluoroalkyl radical with 5 to 11 carbon atoms.

8. Perfluoroalkylalkylmonocarboxylic acid esters according to claim 1, characterised in that they contain a perfluoroalkyl radical with 7 to 9 carbon atoms.

9. Perfluoroalkylalkylmonocarboxylic acid esters of the formula

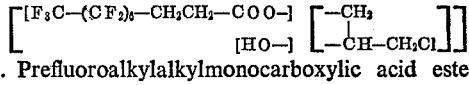

10. Prefluoroalkylalkylmonocarboxylic acid esters of the formula

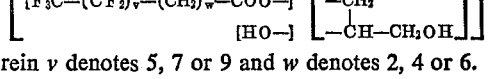

wherein $v$ denotes 5, 7 or 9 and $w$ denotes 2, 4 or 6.

References Cited

UNITED STATES PATENTS

| 3,080,404 | 3/1963 | Klug et al. | 260—408 |
| 2,951,051 | 8/1960 | Tiers | 260—23 |
| 2,865,388 | 10/1958 | Barnhart et al. | 260—78.4 |
| 3,067,222 | 12/1962 | Anderson | 260—410.6 |
| 3,340,295 | 9/1967 | Wheeler et al. | 260—486 |

FOREIGN PATENTS

| 1,102,903 | 2/1968 | Great Britain. |
| 1,485,498 | 5/1967 | France. |
| 1,557,006 | 1/1969 | France. |
| 6,953/63 | 4/1963 | Switzerland. |
| 2,535/65 | 2/1965 | Switzerland. |
| 1,157,320 | 7/1969 | Great Britain. |

ELBERT L. ROBERTS, Primary Examiner

D. G. RIVERS, Assistant Examiner

U.S. Cl. X.R.

117—121, 124, 127, 138.8 F, 138.8 M, 138.8 UA, 141, 143, 144, 154; 260—348 A, 404.5 468 J, 486 H, 487